United States Patent
Elizondo et al.

(10) Patent No.: US 6,542,476 B1
(45) Date of Patent: Apr. 1, 2003

(54) SYSTEM AND METHOD FOR DYNAMIC TIMER REGENERATION

(75) Inventors: Alejandro Elizondo, Saltillo (MX); Cesar Garcia, Saltillo (MX); Agustin Salguero, Saltillo (MX)

(73) Assignee: Telefonaktiebolaget LM Ericsson (publ) (SE)

( * ) Notice: Subject to any disclaimer, the term of this patent is extended or adjusted under 35 U.S.C. 154(b) by 0 days.

(21) Appl. No.: 09/359,816

(22) Filed: Jul. 23, 1999

Related U.S. Application Data

(60) Provisional application No. 60/104,658, filed on Oct. 16, 1998.

(51) Int. Cl.$^7$ ............................................. H04B 7/005
(52) U.S. Cl. ...................... 370/278; 370/352; 370/401; 379/230; 455/422
(58) Field of Search ................................ 455/461, 422; 379/133, 115, 230, 229; 370/352–356, 401, 402, 386, 432, 329, 437, 466, 496, 278

(56) References Cited

U.S. PATENT DOCUMENTS

| | | | |
|---|---|---|---|
| 5,828,704 A | 10/1998 | Kuramatsu | 375/316 |
| 6,047,059 A * | 4/2000 | Lin et al. | 379/230 |
| 6,330,313 B1 * | 12/2001 | Hunt | 379/133 |
| 6,351,646 B1 * | 2/2002 | Jellema et al. | 455/461 |

FOREIGN PATENT DOCUMENTS

| | | |
|---|---|---|
| GB | 2 241 411 A | 8/1991 |
| WO | WO 96/04728 | 2/1996 |

\* cited by examiner

Primary Examiner—Hassan Kizou
Assistant Examiner—John Pezzlo
(74) Attorney, Agent, or Firm—Jenkens & Gilchrist, P.C.

(57) ABSTRACT

A system and method for dynamic timer regeneration in a communications network comprising a first node, a second node, and a third node, wherein the first and second nodes comprise a first and second response timer, respectively. The first node opens a transaction by sending a first message to the second node, starting the first response timer as prompted by sending the first message; the second node sends a second message to the third node as prompted by receipt of the first message, starting the second response timer as prompted by sending the second message; the second node sends a third message (Restart Timer Message) to the first node to restart the first response timer as prompted by the receipt of the first message and sending the second message; the third node sends a first response message to the second node in response to receipt of the second message, which stops the countdown activity of the second response timer; and the second node closes the transaction by sending a second response message to the first node in response to receipt of the first response message, which stops the countdown activity of the first response timer. All of the messages may be Transaction Capability Application Part (TCAP) messages.

The dynamic timer regeneration is not unlimited; the Restart Timer Message is constructed to support a preselected timeout period, plus a preselected time gap increment which is appropriated to the requirements of the first and second messages.

23 Claims, 6 Drawing Sheets

SYSTEM AND METHOD FOR DYNAMIC TIMER REGENERATION

CROSS REFERENCE TO RELATED APPLICATION

Reference is made to U.S. Provisional Application for Patent Serial No. 60/104,658, filed on Oct. 16, 1998, from which priority is claimed and which is hereby incorporated by reference in its entirety.

BACKGROUND OF THE INVENTION

1. Technical Field of the Invention

The present invention relates to networked communications systems, and in particular, to a system and method operating within a communications network providing the ability to restart nodal entity timers along extended message pathways so as to preclude unnecessary timeout errors.

2. Description of Related Art

Within a communications network messages are passed between terminal points, which may also be characterized as nodal entities. The usual order of communication involves a message sent from a first node to a second node, and a response or reply, prompted by sending the initial message, sent from the second node to the first node. For various reasons, such as the presence of excessive electronic noise or a physical fault in the network, the response may never reach the first node.

Timers have been built into network nodes to ensure that the failure to receive a response does not result in network inactivity for an indefinite period. That is, when a message is sent from one node to another, a timer within the sending node is typically started and allowed to run for a preselected period of time. If no response is received before the timeout period of the timer (i.e., timer count down to a value of zero), then the sending node is alerted to this fact and appropriate recovery measures can be taken. For example, a second message may be sent into the network to determine the reason for the fault condition, or the same message may be re-sent along a different pathway. In any case, it is the timer within the sending node that determines the amount of time for which response to any particular message is allowed.

As a matter of efficiency, nodal response timers are typically set to a fixed timeout value. For example, within a telecommunications network comprising a plurality of Mobile Switching Centers (MSCs), each MSC typically comprises an operation transaction timer, or response timer, with a static default timeout value limit of about 10 seconds. The American National Standards Institute (ANSI) 41-D Standard provides a summary description of response timers and their timeout values, as used during Mobile Application Part (MAP) operations. The timeout values are specified as default values, and are supposed to be optimized for each specific operating environment. These default values are successfully used when a minimal number of nodes are involved in any particular communications scenario. However, during more complex transactions, e.g., hand-off with Tandem, Short Message Service (SMS), Code Division Multiple Access (CDMA), authentication, international roaming, and various Wireless Intelligent Network (WIN) services, where three or more nodes are involved in the same transaction, the default values may not be sufficient to ensure receipt of a response before a timeout error is generated within the original sending node. That is, the original sending node may use a default timeout value which is too short to allow processing of the message by a second node, which in turn must communicate with a third node (and so on) in order to provide a response to the message sent by the first node.

Another example of this problem may be seen in the operation of inter-exchange handoff operations. Inter-exchange handoffs involve passing off mobile telephone call connections from one MSC to another. Within a handoff operation, four types of MSC exchanges are typically present: an anchor exchange, the MSC from which the call is originated; a serving exchange, the MSC presently serving the call; a Tandem MSC, which previously handed off the call to the Serving MSC; and a target exchange, an MSC to which the call is to be handed off. A handoff from the serving exchange to an exchange involved in the call path is known as a "handoff back", while a handoff from the serving exchange to another exchange (which is not involved in the call path) is referred to as a "handoff forward".

Such handoffs are typically successful, unless other exchanges are involved. For example, when a handoff forward with path minimization occurs (in which an additional Tandem exchange is involved), the handoff may not be successful due to the additional time required to pass a message (i.e. Handoff to Third or Handoff to Third 2) through the Tandem exchange, because the message transmission requires more time than the default response timer value in the serving exchange allows.

Thus, what is needed is, a system and method providing the ability to dynamically regenerate timers within nodal entities so as to accommodate message passing between such entities along an extended communication path. However, dynamic timer regeneration should not be unlimited, while still providing a reasonable amount of time for each message, as it is passed from one node to another, to secure a response. Therefore, each message transaction should result in the initiation of a new timeout activity and regeneration of any previous timeout activities which are currently pending. Such a system and method should be easily integrated into current standards, such as ANSI 41-D. Also, such a system and method should be easily accommodated by currently available equipment and software.

SUMMARY OF THE INVENTION

The present invention solves the foregoing problems arising from messages passed between several nodal entities by providing a method and system for dynamic timer regeneration within each of the nodal entities along the path. In the most basic form, three nodes within a communications network, wherein the first and second nodes comprise a first and second response timer, respectively, can make use of the method during the process of opening a transaction by sending a first message from the first node to the second node, starting the first response timer as prompted by sending the first message, sending a second message from the second node to the third node as prompted by receipt of the first message, starting the second response timer as prompted by sending the second message, sending a message from the second node to the first node to restart the first response timer as prompted by receipt of the first message and sending the second message, sending a first response message from the third node to the second node in response to receipt of the second message, and closing the transaction without unnecessary timeout errors by sending a response message from the second node to the first node in response to receipt of the first response message.

Such a method, wherein the first, second, and third nodes may all comprise MSCs, prevents the occurrence of unnecessary timeout errors by restarting the response timer of each node along a network path as the message is passed from node to node, until it reaches the terminal node in the pathway. Of course, the nodes in the network may comprise any number of nodal entities, such as MSCs, Service Control Functions (SCFs), Intelligent Peripherals (IPs), etc.

A wireless communication signaling network comprising a plurality of nodes engaged in a Transaction Capability Application Part (TCAP) transaction may also be used to support the method of the present invention. In this case, the transaction is a TCAP transaction, and the message sent between the nodes will typically be an Invoke message. The restart message for response timers is typically a TCAP message with a Package Type Identifier of Conversation Without Permission, and a Component Portion including an Invoke (Last) component.

A system comprising a plurality of nodes in a wireless communication signaling network adapted to support a TCAP transaction using dynamic timer regeneration may comprise a first, second, and third node, wherein the first and second nodes each comprise a first and second response timer, respectively. The first node is adapted to receive a third TCAP message to restart the first response timer and a second response message from the second node to stop the countdown activity of the first response timer. The second node is adapted to send a third message (to restart the first response timer) to the first node upon receipt of a first TCAP message from the first node, and to receive a first response message from the third node which stops the countdown activity of the second response timer. The third node is adapted to send a first response message to the second node upon receipt of a second TCAP message from the second node. The third TCAP message is typically an Invoke message.

In each embodiment, dynamic timer regeneration should not be unlimited. A reasonable amount of time should be provided to support the Restart Timer Message timeout period for each message in the forward communications path.

BRIEF DESCRIPTION OF THE DRAWINGS

A more complete understanding of the method and apparatus of the present invention may be acquired by reference to the following Detailed Description when taken in conjunction with the accompanying drawings, wherein.

DETAILED DESCRIPTION

Figure 1:
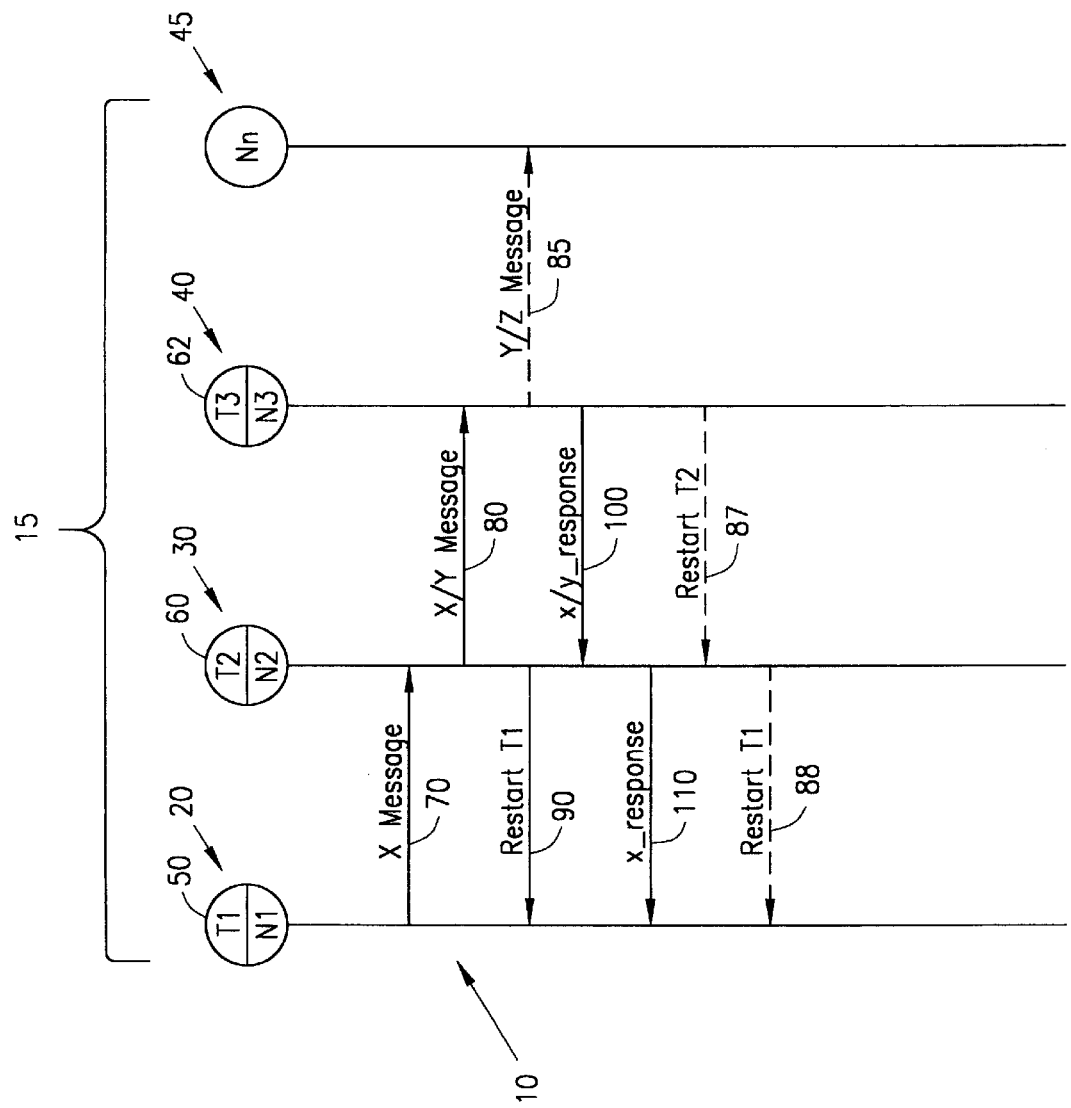
FIG. 1 is a signal flow and nodal operation diagram illustrating the system and method of the present invention.

Turning now to FIG. 1, a signal flow and nodal operation diagram illustrating the system 15 of the present invention operating within a communications network 10 can be seen. The system 15 of the present invention, in its minimal form, comprises a plurality of nodes, such as a first node 20, a second node 30, and a third node 40. The first, second, and third nodes 20, 30, and 40 comprise first, second, and third response timers 50, 60, and 62, respectively. The plurality of nodes within the system 15 of the present invention as it operates within a communications network 10 may also comprise other nodes, such as node Nn 45.

The communications network 10 may comprise a Wireless Intelligent Network, and the nodes 20, 30, and 40 may comprise MSCs. Typically, the nodes 20, 30, and 40, are engaged in a Transaction Capability Application Part (TCAP) communication transaction wherein messages are sent between the nodes in a serial fashion so as to elicit dynamic response timer regeneration.

For example, a first Message 70 may be sent from the first node 20 to the second node 30, prompting a message response countdown by the first response timer 50. If a response to the first Message 70 is not received before the timeout period of the first response timer 50, then a timeout error will arise within the first node 20. If the content of the first Message 70 is such that a response may be sent immediately from the second node 30 back to the first node 20, then no dynamic timer regeneration occurs. However, if the content of the first Message 70 is such that a second Message 80 must be sent from the second node 30 to the third node 40, then the second response timer 60 is started at the time the Message 80 is sent, and the second node 30 proceeds to wait for a response. A Restart Timer Message 90 is also sent back to the first node 20 from the second node 30 at this time so as to restart the first response timer 50 with a preselected timeout period, plus a preselected time gap increment, the length of the period and increment typically depending on the default timeout period of the first response timer 50 and the default timeout period of the second response timer 60. For example, if the default timeout period of the first timer 50 is ten seconds, and the default timeout period of the second response timer 60 is five seconds, the total restart timeout period and time gap increment for the first response timer 50 is typically selected to be at least ten seconds (i.e., greater than the default timeout period for the first timer 50) and less than fifteen seconds (i.e., less than the sum of the default timeout period for the first response timer 50 and the default timeout period for the second response timer 60).

Assuming that the third node 40 is capable of supplying the response 100 required by the second Message 80, the first response message 100 is sent from the third node 40 to the second node 30, and in turn, the second response message 110 is sent from the second node 30 to the first node 20. Of course, the first and second Messages 70 and 80 may be identical, or different. Typically, in a wireless communication signaling network 10, the Messages 70, 80, 90, 100, and 110 are TCAP Messages. The Restart Timer Message 90 is typically a TCAP Message having a Package Type Identifier of Conversation Without Permission, and a Component Portion, which includes an Invoke (Last) component.

Thus, the system 15 of the present invention may comprise a plurality of nodes in a wireless communication signaling network 10 adapted to support closing a TCAP transaction using dynamic timer regeneration. The system 15 may be embodied by an apparatus which comprises a first node 20 selected from the plurality of nodes 15 (including wireless communication network signaling nodes) having a first response timer 50, a second node 30 selected from the plurality of nodes 15 comprising a second response timer 60, and a third node selected from the plurality of nodes 15. The first, second, and third nodes 20, 30, and 40 are in electronic communication with each other, and are each adapted, typically, to send and receive TCAP Messages, including messages to restart response timers having Package Type Identifiers of Conversation Without Permission, and Component Portions including an Invoke (Last) component.

The system 15 may also comprise many more nodes than those that are shown in FIG. 1, and the set of Restart Timer messages may also increase as necessary. For example, the system 15 may also comprise a fourth node, Nn 45, or any other number of nodes. Additional messages, such as Y/Z messages 85 may be sent, which will in turn prompt sending Restart Timer Messages 87, 88 (which may be the same message), as needed.

Figure 2:
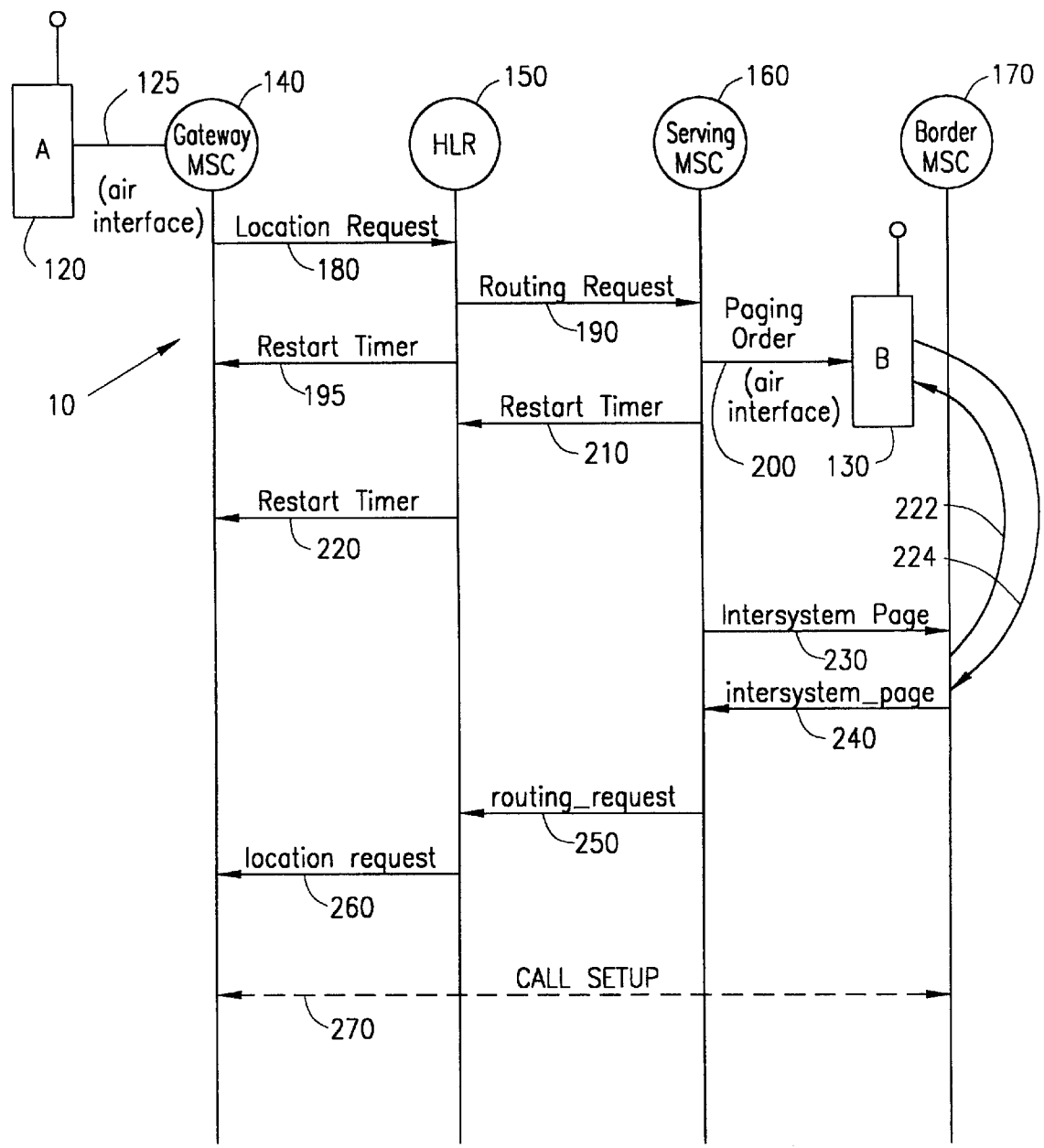
FIG. 2 is a signal flow and nodal operation diagram illustrating the method of the present invention as embodied in an intersystem page series of transactions.

FIGS. 2–6 illustrate flow and nodal operation diagrams for specific embodiments of the system and method of the present invention. Turning now to FIG. 2, the case of an inter-system paging operation can be seen. In this situation, Subscriber "A" 120 attempts to reach Subscriber "B" 130 using a series of messages through the network 10 as they propagate through various nodes: the Gateway MSC 140, the Home Location Register (HLR) 150, the Serving MSC 160, and the Border MSC 170. The process begins with a request for call setup by Subscriber "A" 120 over the air interface 125 (the typical radio base station, well known in the art, is not shown). The Gateway MSC 140 initiates a Location Request Message 180 toward the Home Location Register (HLR) 150. This Request 180 begins the timeout process for the response timer located in the Gateway MSC 140. In turn, a Routing Request Message 190 is sent from the HLR 150 to the Serving MSC 160. At about the same time, a Restart Timer Message 195 is sent from the HLR 150 to the Gateway MSC 140 to restart the Gateway MSC 140 Response Timer while the HLR 150 awaits the reception of a response to the Routing Request Message 190. The Serving MSC 160 is prompted by the Routing Request Message 190. The Serving MSC 160 is prompted by the Routing Request Message 190 to place a Paging Order 220 over the air interface to the "B" Subscriber 130 (again, no radio base station is shown). The response timer within the HLR 150 is now started. However, in this scenario, no response is received from the "B" Subscriber 130 because the "B" Subscriber 130 is located out of the range of the (base station connected to the) Serving MSC 160. However, the "B" Subscriber, for the purposes of this scenario, is located within the range of the Border MSC 170. Therefore, when no response is received to the Paging Order 200, which is accompanied by Messages 210 and 220 to restart the response timers for the HLR 150 and the Gateway MSC 140, respectively, an inter-system page message is sent from the Serving MSC 160 to the Border MSC 170. This prompts a Paging Order Message 222 to Subscriber "B" 130 from the Border MSC 170. Since the Subscriber "B" 130 is within range of the Border MSC 170, a Paging Response Message 224 is received by the Border MSC 170. Thus, the intersystem-page Response Message 240 is sent from the Border MSC 170 to the Serving MSC 160, which in turn sends a routing-request Response Message 250 to the HLR 150 which in turn sends a location-request Response Message 260 to the Gateway MSC 140. This series of communications results in a Call Setup 270 between the Gateway MSC 140 and the Border MSC 170, with no unnecessary timeout errors being generated. The Restart Timer Messages 195, 210 and 220 may be in the form of TCAP Messages, as noted above.

Figure 3:
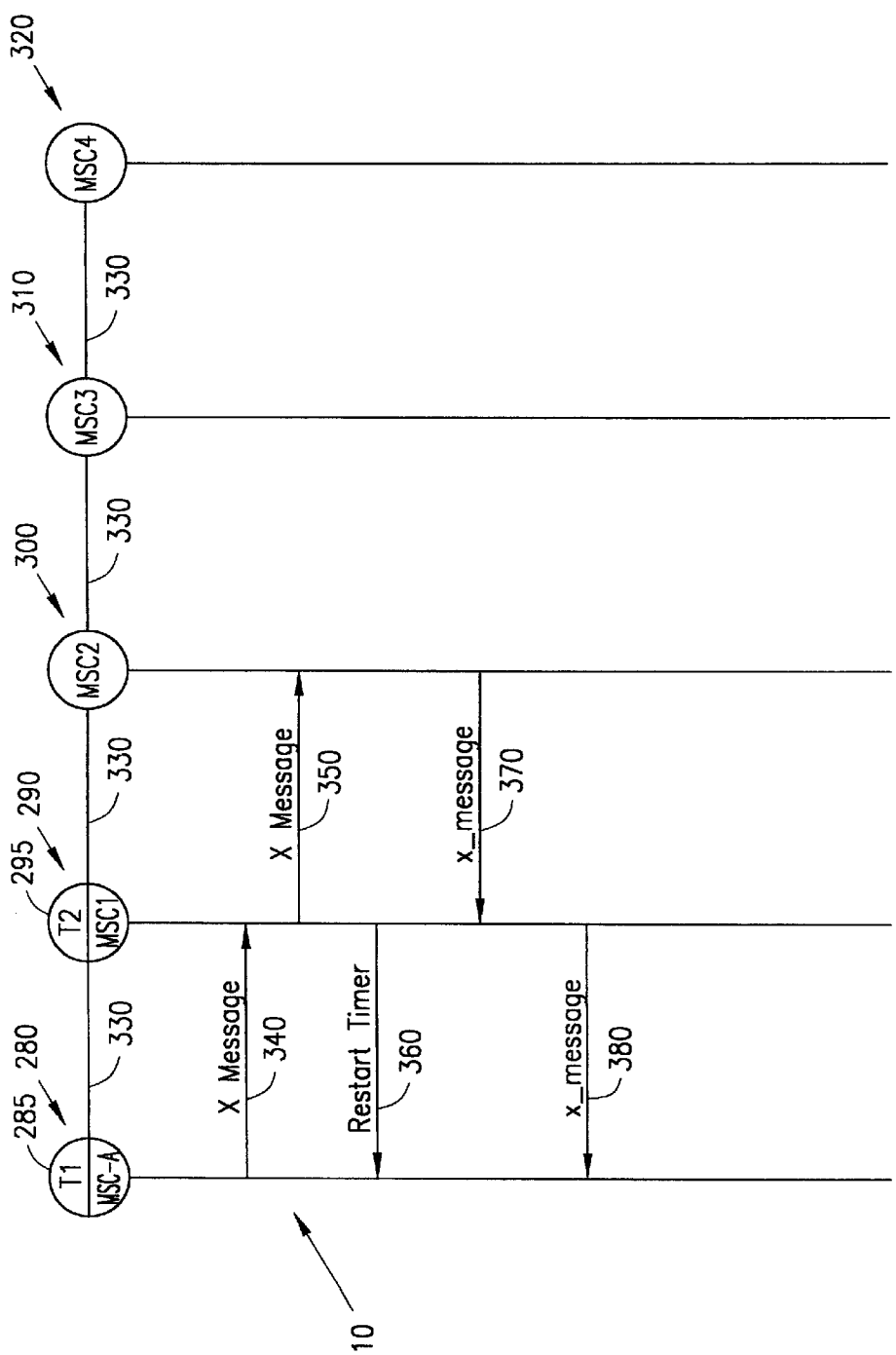
FIG. 3 is a signal flow and nodal operation diagram illustrating the method of the present invention as embodied by a plurality of MSCs which share the same destination point code.

Turning now to FIG. 3, the method of the present invention as used to pass messages between multiple MSCs sharing the same destination point code can be seen. In this case, MSC-A 280, MSC1 290, MSC2 300, MSC3 310, and MSC4 320 all are connected by physical cabling 330, and it is desired to send a message, the X Message 340, from the MSC-A 280 to the MSC2 300, which is physically connected to the other side of MSC1 290.

In the communications network comprising a first node 280, a second node 290, and a third node 300, wherein the first node 280 comprises a first response timer 285, and the second node 290 comprises a second response timer 295, the method for dynamic timer regeneration, in which a message is sent from the first node 280 to the second node 290, and subsequently from the second node 290 to a third node 300 comprises the steps of opening a transaction (which may be a TCAP transaction) by sending a message, the X Message 340, from the first node 280 to the second node 290, starting the first response timer 285 as prompted by sending the X Message 340 from the first node 280 to the second node 290, sending the X Message 350 (which may be identical to the X Message 340, or different from the X Message 340) from the second node 290 to the third node 300 as prompted by receipt of the X Message 340 from the first node 280, starting the second response timer 295 as prompted by sending the X Message 350 from the second node 290 to the third node 300, sending a Restart Timer Message 360 from the second node 290 to the first node 280 to restart the first response timer 285 as prompted by sending the Message 350 from the second node 290 to the third node 300, sending a Response Message 370 from the third node 300 to the second node 290 in response to receipt of the Message 350 by the third node 300, and closing the transaction by sending a Response Message 380 from the second node 290 to the first node 280 in response to receipt of the Response Message 370 by the second node 290.

Other nodes in the network 10, which can be any wireless communication network signaling node, may be involved in similar multi-message transactions; in the illustrated case of FIG. 3, nodes 280, 290, and 300 were selected from the plurality of nodes 280, 290, 300, 310, and 320 which comprised the wireless communication signaling network 10. As noted previously, the nodes 280, 290, 300, 310, and 320 may all comprise MSCs, or, for example, the first node 280 may comprise an MSC, the second node 290 may comprise a Service Control Function (SCF), and the third node 300 may comprise an Intelligent Peripheral (IP). To extend the idea of the invention still further, the first node 280 may be selected from one of a Gateway Mobile Switching Center (GMSC), an MSC, or a Message Center (MC). The second node 290 may be selected from one of a Home Location Register (HLR), a SCF, an International Gateway (IGW) or a Service Control Point (SCP). Also, as noted previously, the Messages 340, 350 (and 370, 380) may be ANSI-41D Invoke Messages.

Figure 4:
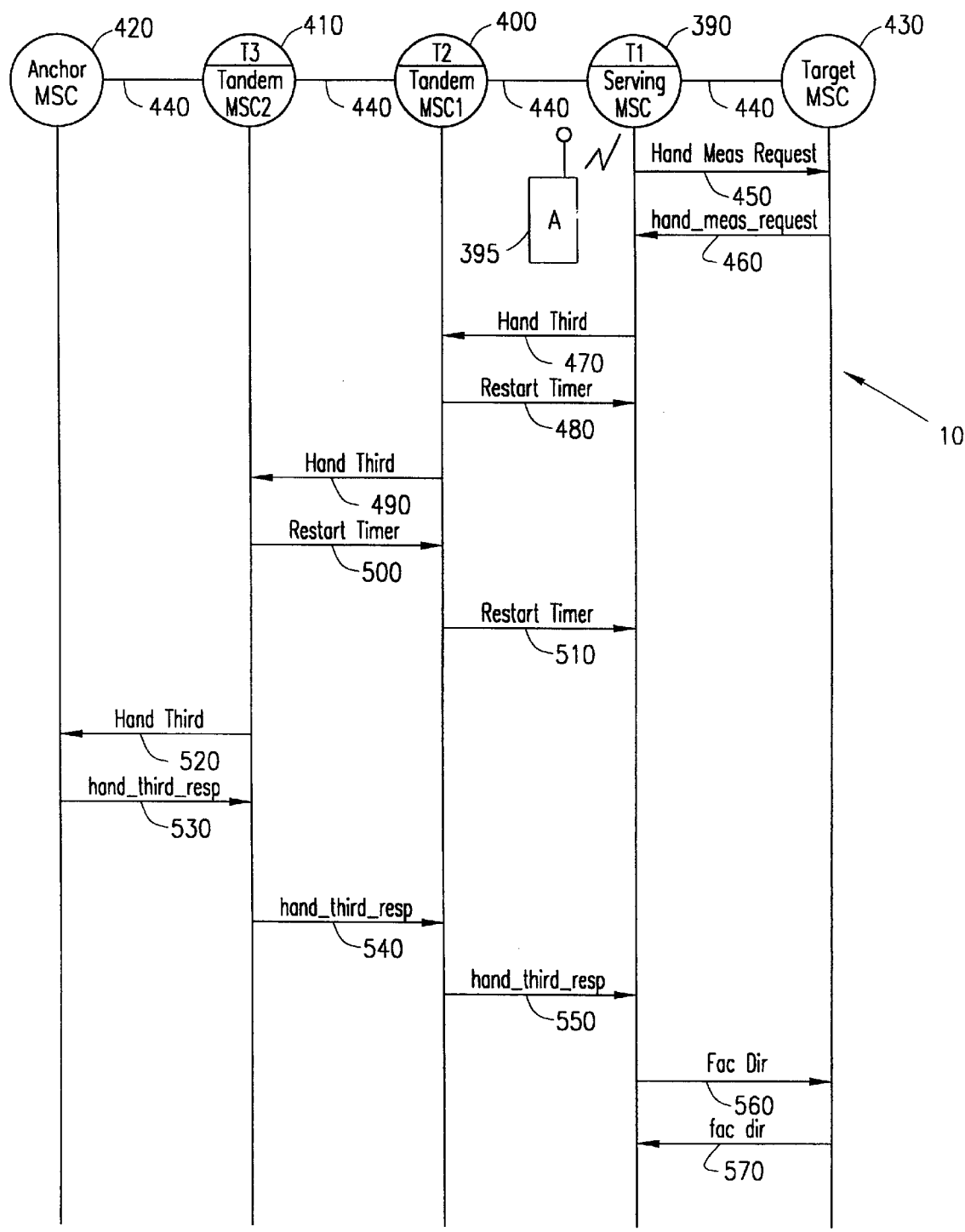
FIG. 4 is a signal flow and nodal operation diagram illustrating the method of the present invention as embodied in a handoff with Tandem communication scenario.

Turning now to FIG. 4, the signal flow and nodal operation diagram illustrating the method of the present invention as embodied in a handoff with Tandem scenario can be seen. In this case, the communications network 10 comprises a first node (Serving MSC) 390, a second node (Tandem MSC1) 400, a third node (Tandem MSC2) 410, and a fourth node (Anchor MSC) 420. A fifth node (Target MSC) 430 is also involved in the series of transactions, but in a peripheral fashion. That is, it is not directly involved in the series of transactions which results in Restart Timer Messages (480, 500, and 510) being elicited.

The scenario results when a Subscriber "A" 395 is to be handed off from the Serving MSC 390 to the Target MSC 430, and the Anchor MSC 420 is accessible only through the Tandem MSC1 400 and the Tandem MSC2 410. Each of the nodes 390, 400, 410, 420, and 430 are in electronic communication with the other, by way of a series of signaling trunks 440.

The scenario begins with a Handoff Measurement Request Message 450 sent from the Serving MSC 390 to the Target MSC 430, and a handoff-measurement-request Response Message 460 being received by the Serving MSC 390 from the Target MSC 430. The response 460 prompts the Serving MSC 390 to send a Handoff to Third Message 470 to the Tandem MSC1 400. This begins the timeout period for receiving the response to the Message 470 within the Serving MSC 390. The Handoff to Third Message 490 is passed on from the Tandem MSC1 400 to the Tandem MSC2 410, and results in a Restart Timer Message 480 being sent from the Tandem MSC1 400 to the Serving MSC 390. The Handoff to Third Message 490 results in starting the response timer within the Tandem MSC1 400, and restarting the response timer within the Serving MSC 390.

Upon receipt of the Handoff to Third Message 490 at the Tandem MSC2 410, a third Handoff to Third Message 520 is sent from the Tandem MSC2 410 to the Anchor MSC 420. Sending the Message 520 begins the response timer timeout period for the Tandem MSC2 410 and results in sending Restart Timer Messages 500 and 510 to the Tandem MSC1 400 and the Serving MSC 390, respectively. This restarts all of the timers in the line while the Tandem MSC2 410 waits for a response to the Message 520 received by the Anchor MSC 420.

The Anchor MSC 420 is able to respond to the Message 520, and thus sends a handoff-to-third response Message 530 to the Tandem MSC2 410, which in turn prompts sending of a handoff-to-third response Message 540 from the Tandem MSC2 410 to the Tandem MSC1 400, which in turns prompts sending a handoff- to-third response Message 550 from the Tandem MSC1 400 to the Serving MSC 390. At this point, the TCAP transaction has been completed and a Facilities Directive Message 560 can be sent from the Serving MSC 390 to the target MSC 430, requesting the Target MSC 430 to initiate the handoff task. The response to the Facilities Directive Message 560 is the facilities-directive-response Message 570.

Figure 5:
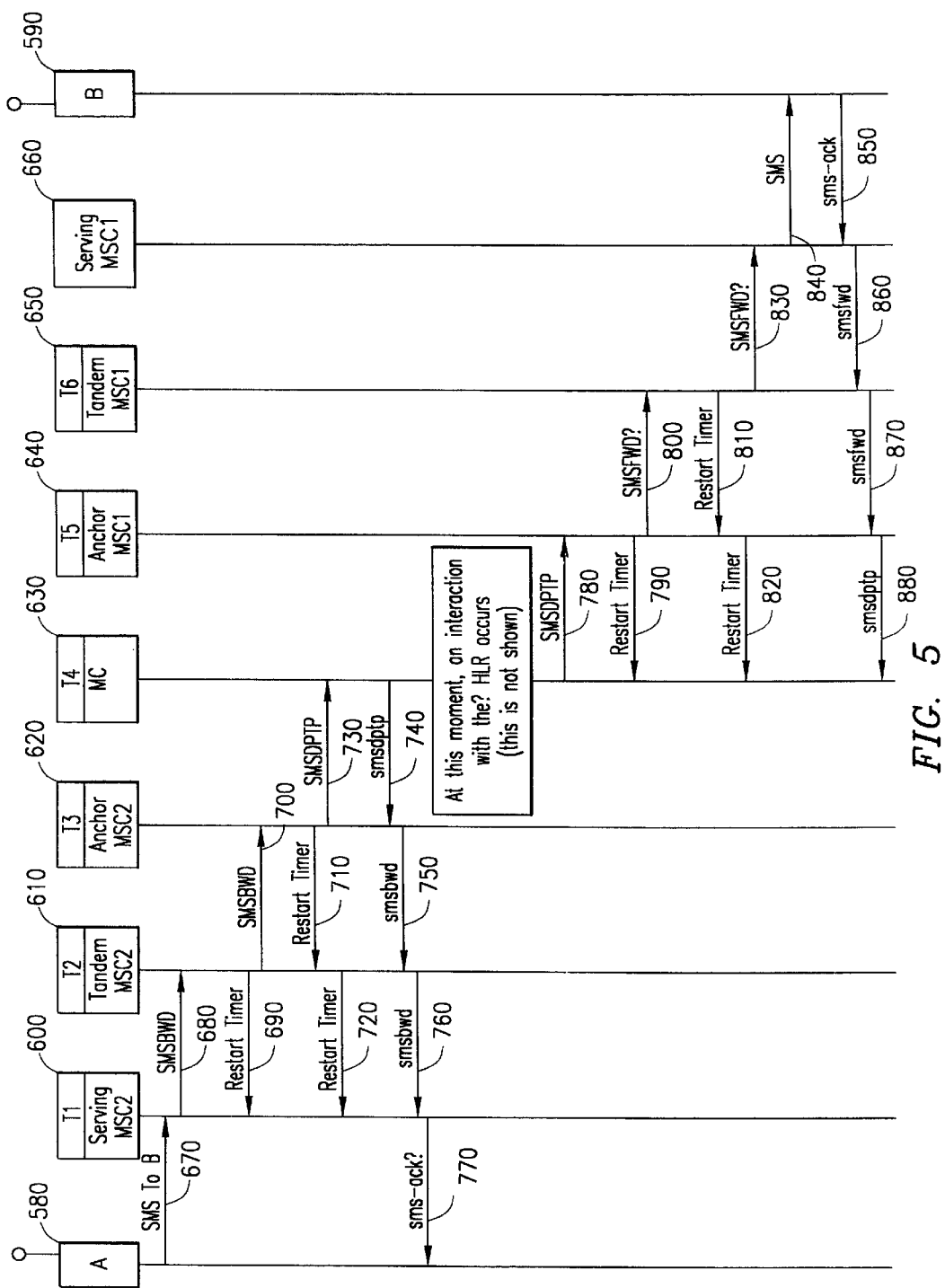
FIG. 5 is signal flow and nodal operation diagram illustrating the method of the present invention as embodied in a Short Message Service during handoff with Tandem scenario.

A slightly more complex version of the invention is illustrated in FIG. 5, wherein the operation of the method embodied in the present invention is shown with respect to Short Message Service activity which occurs during a handoff with Tandem scenario. In this scenario the Subscriber "B" 590 is engaged in communication with a third party (not shown) and the Subscriber "A" 580 desires to send a Short Message Service (SMS) Message 670 to Subscriber "B" 590.

The first step in the process is for the SMS Message 670 to be sent to the Serving MSC2 600 from Subscriber "A" 580 (no radio base station is shown). This results in sending a SMS Delivery Backward Message 680 (generally used to convey a mobile station-originated short message or other encapsulated data) from the Serving MSC2 600 to the Tandem MSC2 610, and prompts starting a Timer $T_1$. After the first node, or Serving MSC2 600, sends the SMS Delivery Backward Message 680 to the second node, or Tandem MSC2 610, Timer $T_2$ is started and a corresponding SMS Delivery Backward Message 700 prompts sending a Restart Timer Message 690 from the Tandem MSC2 610 to the Serving MSC2 600 to restart the Timer $T_1$ within the Serving MSC2 600.

Receipt of the SMS Delivery Backward Message 700 at the Anchor MSC2 620 results in sending a SMS Delivery Point to Point Message 730 from the Anchor MSC2 620 to the Message Center 630 and prompts starting Timer $T_3$. Sending the SMS Delivery Point to Point Message 730 from Anchor MSC2 620 prompts sending the Restart Timer Message 710 from the Anchor MSC2 620 to the Tandem MSC2 610 (to restart Timer $T_2$), which in turn prompts sending the Restart Timer Message 720 from the Tandem MSC2 610 to the Serving MSC2 600 (to restart Timer $T_1$).

The Message Center 630 is able to respond to the SMS Delivery Point to Point Message 730, and thus sends a sms-delivery-point-to-point response Message 740 to the Anchor MSC2 620, which in turn prompts sending a sms-delivery-backward response Message 750 from the Anchor MSC2 620 to the Tandem MSC2 610, which in turn prompts sending a sms-delivery-backward-response Message 760 from the Tandem MSC2 610 to the Serving MSC2 600. Receipt of the sms-delivery-backward response Message 760 at the Serving MSC2 600 then prompts sending the sms-ack Message 770 to the Subscriber "A" 580 by way of the air interface from the Serving MSC2 600.

After the sms-delivery-point-to-point response Message 740 is sent by the Message Center 630, an interaction with the HLR occurs (no signaling interaction shown). This results in sending a SMS Delivery Point to Point Message 780 from the Message Center 630 to the Anchor MSC1 640 and prompts starting Timer $T_4$.

Receipt of the SMS Delivery Point to Point Message 780 at the Anchor MSC1 640 prompts sending a SMS Delivery. Forward Message 800 to the Tandem MSC1 650, and the Restart Timer Message 790 from the Anchor MSC1 640 to the Message Center 630 (to restart Timer $T_4$), and starts the Timer $T_5$. Receipt of the SMS Delivery Forward Message 800 at the Tandem MSC1 650 prompts sending the SMS Delivery Forward Message 830 from the Serving MSC1 660, and the Restart Timer Message 810 from the Tandem MSC1 650 to the Anchor MSC1 640 (to restart Timer $T_5$) and starts the Timer $T_6$. Receipt of the Restart Timer Message 810 at the Anchor MSC1 640 in turn prompts sending a Restart Timer Message 820 from the Anchor MSC1 640 to the Message Center 630 (to restart Timer $T_4$).

After receiving the SMS Delivery Forward Message 830 at the Serving MSC1 660, the SMS Message 840 can be sent to the Subscriber "B" 590 by way of the air interface (no radio base station shown). A sms-ack response message 840 is then received by the Serving MSC1 660 to acknowledge receipt of the SMS Message 840 by Subscriber "B" 590.

Receipt of the sms-ack response Message 850 at the Serving MSC1 660 prompts sending the sms-delivery-forward response Message 860 from the Serving MSC1 660 to the Tandem MSC1 650, which in turn prompts sending the sms-delivery-forward response Message 870 from the Tandem MSC1 650 to the Anchor MSC1 640. Receipt of the sms-delivery-forward response Message 870 at the Anchor MSC1 640 prompts sending a sms-delivery point-to-point response Message 880 from the Anchor MSC1 640 to the Message Center 630.

In this scenario it should be noted that every time a message is sent from the MSC 600, 610, 620, 640, 650 and 660 or MC 630, that a corresponding timer within the node or exchange begins to count down a timeout period while waiting for a response. It should be readily apparent from the example shown in FIG. 5 that a single, default timeout period (without reset) along the nodal pathway is insufficient to ensure that timeout errors will not occur unnecessarily. Further, it should be noted that the response timers within each exchange or node are stopped upon receipt of the correct response for the message that has been sent. For example, when the Serving MSC2 600 sends the SMS Delivery Backward Message 680, and Response Timer $T_1$ begins to count down, receipt of the Restart Timer Messages 690 and 720 ensure that the Response Timer $T_1$ will not prematurely count down to zero before receipt of the sms-delivery-backward response Message 760. Similarly, for example, after the SMS Delivery Point to Point Message 780 is sent from the Message Center 630, Response Timer $T_4$ is started and begins to count down to zero. Receipt of the Restart Timer Messages 790 and 820 ensure that the Response Timer $T_4$ will not prematurely count down to zero before a reasonable period of time elapses (allowed by the Restart Timer Messages) to provide for receipt of the sms-delivery-point-to-point response Message 880. This timeout period has been referred to as a "preselected timeout period plus a preselected time gap increment" herein.

Figure 6:
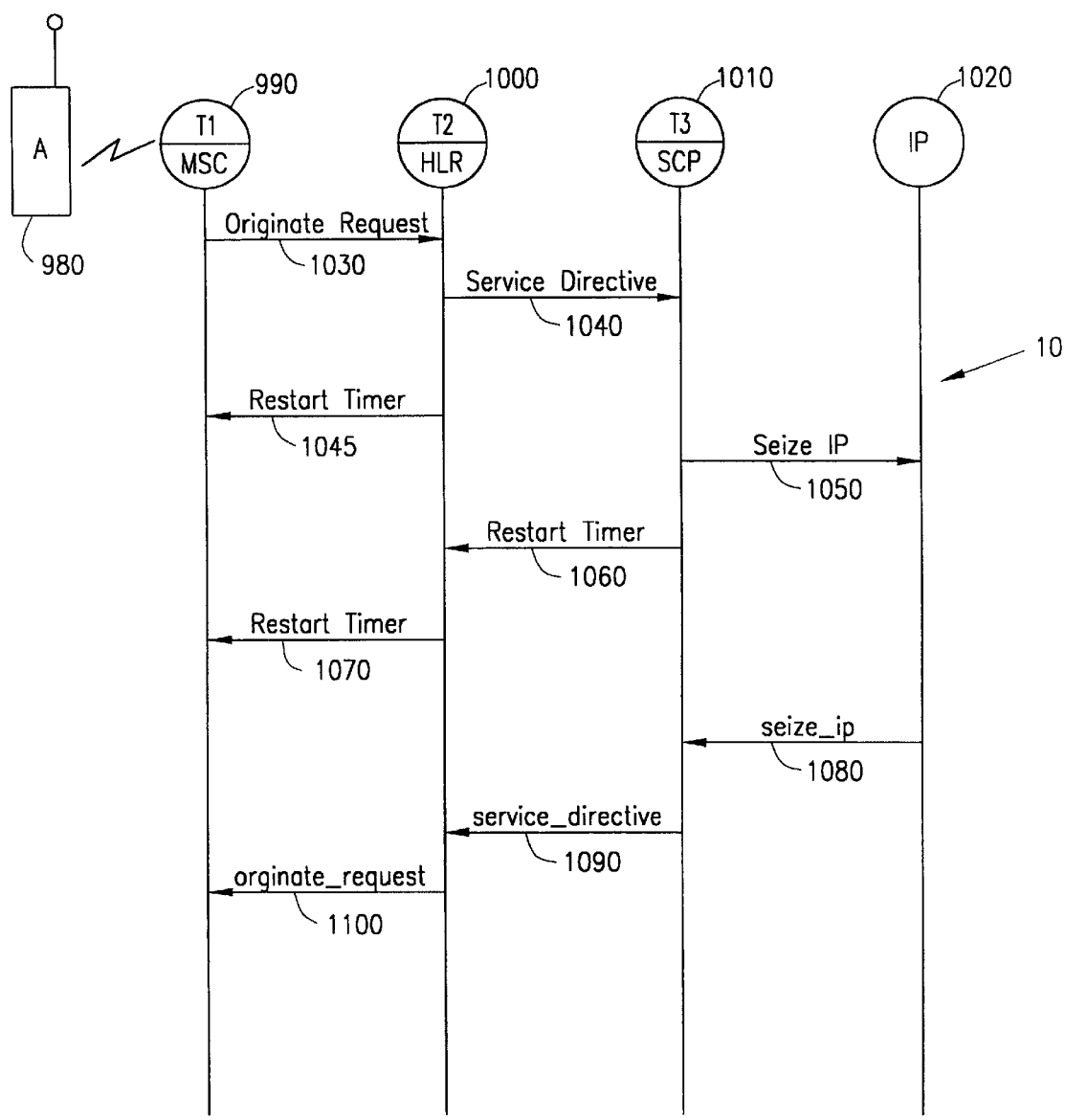
FIG. 6 is a signal flow and nodal operation diagram illustrating the method of the present invention as embodied in the implementation of Wireless Intelligent Network services.

FIG. 6 is a signal flow nodal operation diagram illustrating the method of the present invention as embodied by the provision of WIN 10 services. In this case, a Service Control Point (SCP) 1010 requires the services of another node, the Intelligent Peripheral (IP) 1020. Subscriber "A" 980 is connected to the MSC 990 by way of an air interface (via a radio base station, not shown).

The process begins with the MSC 990 sending an Origination Request Message 1030 to the HLR 1000 to request call origination treatment on behalf of the registered mobile station 980. At this time, Response Timer $T_1$ within the MSC 990 is started to count down the time allowed to receive a response to the Origination Request Message 1030. Receipt of the Request Message 1030 by the HLR 1000 prompts sending a Service Directive Message 1040 to the Service Control Point (SCP) 1010 and starting the Response Timer $T_2$ within the HLR 1000 to count down for the time allowed to receive a response to the Message 1040. Receipt of the Origination Request Message 1030 and sending the Service Directive Message 1040 also prompts sending a Restart Timer Message 1045 from the HLR 1000 to the MSC 990 to reset the Response Timer $T_1$ within the MSC 990. The SCP 1010 then sends a Message 1050 to seize the IP 1020, and this prompts starting the Response Timer $T_3$ within the SCP 1010 and sending a Restart Timer Message 1060 from the SCP 1010 to the HLR 1000, which in turn prompts sending a Restart Timer Message 1070 from the HLR 1000 to the MSC 990.

The IP 1020 then responds to the SCP 1010 by sending a seize-intelligent-peripheral response Message 1080 to the SCP 1010, which in turn prompts sending a service-directive response Message 1090 from the SCP 1010 to the HLR 1000, which in turn prompts sending an origination-request response Message 1100 from the HLR 1000 to the MSC 990. Again, at each node 990, 1000, and 1010 the timers $T_1$, $T_2$, and $T_3$ respectively, are reset upon receiving appropriate Response Messages 1100, 1090, and 1080 respectively. However, it is the Restart Timer Message 1060, for example, that ensures that the Time $T_2$ within the HLR 1000 does not prematurely reach a value of zero before receiving the service-directive response Message 1090 after sending the Service Directive Message 1040 to the SCP 1010.

FIGS. 2–6 illustrate various examples of the system and method embodied in the present invention. It should be noted that several variations are possible, including the type of nodes which can be used to pass messages within a network, and the type and format of messages which are sent. For example, the first node in the network can be an MSC, an HLR/MSC, an Anchor MSC, a Serving MSC, or an MC. Similarly, the second node may be an IGW, an SCP, a Tandem MSC, or an Anchor MSC. Also, the third node may be an IP, a Serving MSC, an Anchor MSC, or a Tandem MSC, for example. Finally, any of the nodes may be any type of wireless communication signaling nodes.

While most of the scenarios described involve TCAP transactions using appropriate TCAP message formatting and terminology, other types of message formats and transaction types are anticipated by the instant invention. The network activity which prompts timer reset messages to effect dynamic timer regeneration may involve any type of TCAP message, or any other type of message which operates to determine whether a response is received within a finite time period. Other types of protocol (e.g., ANSI-41, GSM) and messages (e.g., messages included in the ANSI-41 or GSM protocols) may also be used. Essentially, any time three or more nodes are used to pass messages within a network, the system and method of the present invention may be implemented.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the scope of the invention as set forth and defined by the following claims.

What is claimed is:

1. In a communications network comprising a first node, a second node, and a third node, wherein the first node comprises a first response timer, a method which supports closing a transaction including a plurality of messages using dynamic timer regeneration comprises the steps of:
   opening a transaction by sending a first message from the first node to the second node;
   sending a second message from the second node to the third node as prompted by receipt of the first message;
   sending a third message from the second node to the first node to restart the first response timer as prompted by receipt of the first message and sending the second message;
   sending a first response message from the third node to the second node in response to receipt of the second message; and
   closing the transaction by sending a second response message from the second node to the first node in response to receipt of the first response message.

2. The method of claim 1, wherein the first, second and third nodes are communication network signaling nodes.

3. The method of claim 1, wherein the second node comprises a second response timer, comprising the steps of:
   starting the first response timer as prompted by sending the third message; and
   starting the second response timer as prompted by sending the second message.

4. The method of claim 1, wherein the transaction is a Transaction Capability Application Part (TCAP) transaction.

5. The method of claim 4, wherein the first, second and third messages are Invoke messages.

6. The method of claim 1, wherein the first node is a selected one of a Gateway Mobile Switching Center (GMSC), a Mobile Switching Center (MSC), a Message Center (MC), an International Gateway (IGW), an Authentication Center (AC), a Home Location Register (HLR), a Visitor Location Register (VLR), an Equipment Identity Register (EIR), an Over-The-Air Service Provisioning Function (OTAF), a Short Message Entity (SME), a Service Node (SN), a Service Control Point (SCP), or an Intelligent Peripheral (IP).

7. The method of claim 1, wherein the second node is a selected one of a Gateway Mobile Switching Center (GMSC), a Mobile Switching Center (MSC), a Message Center (MC), an International Gateway (IGW), an Authentication Center (AC), a Home Location Register (HLR), a Visitor Location Register (VLR), an Equipment Identity (EIR), an Over-The-Air Service Provisioning Function (OTAF), a Short Message Entity (SME), a Service Node (SN), a Service Control Point (SCP), or an Intelligent Peripheral (IP).

8. The method of claim 1, wherein the third node is a selected one of Gateway Mobile Switching Center (GMSC), a Mobile Switching Center (MSC), a Message Center (MC), an International Gateway (IGW), an Authentication Center (AC), a Home Location Register (HLR), a Visitor Location Register (VLR), an Equipment Identity Register (EIR), an Over-The-Air Service Provisioning Function (OTAF), a Short Message Entity (SME), a Service Node (SN), a Service Control Point (SCP), and an Intelligent Peripheral (IP).

9. The method of claim 1, wherein the second message is the same or different than the first message.

10. The method of claim 1, wherein the communications network comprises a fourth node and the second node comprises a second response timer, comprising the steps of:
sending a fourth message from the third node to the fourth node as prompted by receipt of the second message;
sending a fifth message from the third node to the second node to restart the second response timer as prompted by receipt of the second message and sending the fourth message;
sending a sixth message from the second node to the first node to restart the first response timer as prompted by receipt of the fifth message; and
sending a third response message from the fourth node to the third node in response to receipt of the fourth message.

11. The method of claim 10, wherein the fifth message is sent back from the third node to the first node.

12. The method of claim 1, wherein the third message is a Restart Timer Message which restarts the first response timer with a preselected timeout period plus a preselected time gap increment.

13. In a wireless communication signaling network comprising a plurality of nodes engaged in a Transaction Capability Application Part (TCAP) transaction, wherein a first node, a second node, and a third node are selected from the plurality of nodes and the first node comprises a first response timer, a method which supports closing the transaction using dynamic timer regeneration comprises the steps of:
opening the TCAP transaction by sending a TCAP message from the first node to the second node;
sending the TCAP message from the second node to the third node as prompted by receipt of the message by the second node;
sending a restart timer message from the second node to the first node to restart the first response timer as prompted by receipt of the TCAP message by the second node and sending the TCAP message from the second node to the third node;
sending a response message from the third node to the second node in response to receipt of the TCAP message by the third node; and
closing the TCAP transaction by sending the response message from the second node to the first node in response to receipt of the response message by the second node.

14. The method of claim 13, wherein the first, second and third nodes are wireless communication network signaling nodes.

15. The method of claim 13, wherein the second node includes a second response timer, comprising the steps of:
starting the first response timer as prompted by sending the TCAP message from the first node to the second node; and
starting the second response timer as prompted by sending the TCAP message from the second node to the third node.

16. The method of claim 13, wherein the TCAP message is an Invoke message.

17. The method of claim 13, wherein the first node is a selected one of a Gateway Mobile Switching Center (GMSC), a Mobile Switching Center (MSC), a Message Center (MC), an International Gateway (IGW), an Authentication Center (AC), a Home Location Register (HLR), a Visitor Location Register (VLR), an Equipment Identity Register (EIR), an Over-The-Air Service Provisioning function (OTAF), a Short Message Entity (SME), a Service Node (SN), a Service Control Point (SCP), or an Intelligent Peripheral (IP).

18. The method of claim 13, wherein the second node is a selected one of Gateway Mobile Switching Center (GMSC), a Mobile Switching Center (MSC), a Message Center (MC), an International Gateway (IGW), an Authentication Center (AC), a Home Location Register (HLR), a Visitor Location Register (VLR), an Equipment Identity Register (EIR), an Over-The-Air Service Provisioning Function (OTAF), a Short Message Entity (SME), a Service Node (SN), a Service Control Point (SCP), or an Intelligent Peripheral (IP).

19. The method of claim 13, wherein the third node is a selected one of Gateway Mobile Switching Center (GMSC), a Mobile Switching Center (MSC), a Message Center (MC), an International Gateway (IWG), an Authentication Center (AC), a Home Location Register (HLR), a Visitor Location Register (VLR), an Equipment Identity Register (EIR), an Over-The-Air Provisioning Function (OTAF), a Short Message Entity (SME), a Service Node (SN), a Service Control Point (SCP), and an Intelligent Peripheral (IP).

20. The method of claim 13, wherein the restart timer message is a TCAP message with a Package Type Identifier of Conversation Without Permission, and a Component Portion including an Invoke(Last) component.

21. A system comprising a plurality of nodes operating within a wireless communication signaling network adapted to support closing a Transaction Capability Application Part (TCAP) transaction using dynamic timer regeneration comprises:
a first node selected from the plurality of nodes, said first node comprising a first response timer and adapted to receive a third TCAP message to restart the first response timer, and said first node adapted to receive a second response message from the second node which stops the count down activity of the first response timer;

a second node selected from the plurality of nodes, said second node in electronic communication with said first node, said second node comprising a second response timer and adapted to send said third TCAP message to said first node upon receipt of a first TCAP message from the first node, said second node adapted to receive a first response message from said third node which stops the countdown activity of the second response timer; and a third node selected from the plurality of nodes, said third node in electronic communication with said second node and said third node adapted to send the first response message to said second node upon receipt of a second TCAP message from said second node.

22. The method of claim 21, wherein the first, second and third nodes are wireless communication network signaling nodes.

23. The system of claim 21, wherein the third TCAP message has a Package Type Identifier of Conversation Without Permission, and a Component Portion including an Invoke (Last) component.

* * * * *